US011922275B2

(12) United States Patent
Adamowicz et al.

(10) Patent No.: US 11,922,275 B2
(45) Date of Patent: Mar. 5, 2024

(54) SYSTEM AND METHOD FOR DETERMINING A PERTURBATION ENERGY OF A QUANTUM STATE OF A MANY-BODY SYSTEM

(71) Applicants: Arizona Board of Regents on Behalf of the University of Arizona, Tucson, AZ (US); NICOLAUS COPERNICUS UNIVERSITY IN TORÚN, Torún (PL)

(72) Inventors: Ludwik Adamowicz, Tucson, AZ (US); Monika Stanke, Torún (PL); Andrzej Kedziorski, Torun (PL)

(73) Assignees: Arizona Board of Regents on Behalf of the University of Arizona, a body corporate, Tucson, AZ (US); NICOLAUS COPERNICUS UNIVERSITY IN TORÚN, Torun (PL)

( * ) Notice: Subject to any disclaimer, the term of this patent is extended or adjusted under 35 U.S.C. 154(b) by 270 days.

(21) Appl. No.: 17/351,873

(22) Filed: Jun. 18, 2021

(65) Prior Publication Data

US 2021/0398010 A1 Dec. 23, 2021

Related U.S. Application Data

(60) Provisional application No. 63/090,046, filed on Oct. 9, 2020, provisional application No. 63/041,726, filed on Jun. 19, 2020.

(51) Int. Cl.
*G06F 30/398* (2020.01)
*G06N 10/00* (2022.01)

(52) U.S. Cl.
CPC .................. *G06N 10/00* (2019.01)

(58) Field of Classification Search
CPC ........ G06F 2111/10; G06F 30/20; G06F 8/34; G06F 9/4488; G06F 18/214; G06F 30/25;
(Continued)

(56) References Cited

U.S. PATENT DOCUMENTS

| 2014/0324766 | A1* | 10/2014 | Alboszta | G06N 10/00 706/57 |
| 2018/0090200 | A1* | 3/2018 | Soykal | G11C 11/42 |
| 2019/0095811 | A1* | 3/2019 | Antonio | G06N 10/00 |

OTHER PUBLICATIONS

Stanke et al., Relativistic Corrections to the Non-Born-Oppenheimer Energies of the Lowest Singlet Rydberg States of 3He and 4He, The Journal of Chemical Physics 126, 194312 (2007).
(Continued)

*Primary Examiner* — Binh C Tat
(74) *Attorney, Agent, or Firm* — Cozen O'Connor (57) ABSTRACT

A method for determining a perturbation energy of a quantum state of a many-body system includes constructing a wave function that approximates the quantum state by adjusting parameters of the wave function to minimize an expectation value of a zeroth-order Hamiltonian. The zeroth-order Hamiltonian explicitly depends on a finite mass of each of a plurality of interacting quantum particles that form the many-body system, the quantum state has a non-zero total angular momentum, the wave function is a linear combination of explicitly correlated Gaussian basis functions, and each of the explicitly correlated Gaussian basis functions includes a preexponential angular factor. The perturbation energy is calculated from the wave function and a perturbation Hamiltonian that explicitly depends on the finite mass of each of the plurality of interacting quantum particles. The perturbation energy may be added to the minimized expectation value to obtain a total energy of the quantum state.

20 Claims, 2 Drawing Sheets

(58) Field of Classification Search
CPC ........ G06F 17/16; G06F 21/566; G06F 21/75; G06F 2221/034; G01N 2201/12; H01L 29/66977; H01L 33/06; H01L 33/04; H01L 29/15; H01L 29/66439; H01L 33/305; H01L 2224/74; H01L 2224/293; H01L 27/15; H01L 33/025; H01L 33/30; G04F 5/14
USPC .................................................. 716/100–108
See application file for complete search history.

(56) References Cited

OTHER PUBLICATIONS

Morton et al., Energy Levels for the Stable Isotopes of Atomic Helium (4HeI and 3HeI), Canadian Journal of Physics, 84: 83-105, Feb. 2006.
Cafiero et al., Non-Born-Oppenheimer Calculations of H3*, Computational Methods in Science and Technology, 9(1-2), 23-30 (2003).
Mitroy et al., Theory and Application of Explicitly Correlated Gaussians, Reviews of Modern Physics, American Physical Society, vol. 85, Apr.-Jun. 2013.

* cited by examiner

SYSTEM AND METHOD FOR DETERMINING A PERTURBATION ENERGY OF A QUANTUM STATE OF A MANY-BODY SYSTEM

RELATED APPLICATIONS

This application claims priority to U.S. Provisional Patent Application No. 63/090,046, filed Oct. 9, 2020 and titled "Systems and Methods for Calculating Atomic and Molecular Characteristics", and U.S. Provisional Patent Application No. 63/041,726, filed Jun. 19, 2020 and titled "Systems and Methods for Predicting Atomic Transitions". Each of these applications is incorporated herein in its entirety.

STATEMENT REGARDING FEDERALLY SPONSORED RESEARCH OR DEVELOPMENT

This invention was made with government support under Grant No. 1856702, awarded by NSF. The government has certain rights in the invention.

BACKGROUND

Ground and excited states of small neutral and charged systems, both atomic and molecular, are fruitful testing grounds for new quantum mechanical techniques developed for calculating spectral transitions. This testing has been possible due to the availability of very accurate experimental spectra of these systems. An important group of atomic spectral lines are due to splitting of the main lines resulting from spin-orbit interactions. This splitting, which arises from the interaction of the orbital motion of the electrons with the electronic quantum mechanical spins, gives rise to the fine structure of the spectral lines. This fine structure provides a fingerprint which is characteristic of states having non-zero total orbital angular momenta (i.e., L>0) and non-zero total spin (i.e., S>0).

SUMMARY

In most high-precision calculations of atomic and molecular structure, the total energy of a quantum state is approximated using perturbation theory. For example, the total energy $E_{tot}$ of a bound state $|\psi\rangle$ of an atomic system can be approximated via an expansion of the form:

$$E_{tot} = \langle\psi|\hat{H}|\psi\rangle \approx \langle\psi^{(0)}|\hat{H}^{(0)}|\psi^{(0)}\rangle + \alpha^2\langle\psi^{(0)}|\hat{H}^{(2)}|\psi^{(0)}\rangle + \alpha^3\langle\psi^{(0)}|\hat{H}^{(3)}|\psi^{(0)}\rangle + \alpha^4\langle\psi^{(0)}|\hat{H}^{(4)}|\psi^{(0)}\rangle \quad (1)$$

where $\alpha$ is the fine structure constant, $\hat{H}$ is the total Hamiltonian of the atom, each operator $\hat{H}^{(i)}$ represents contributions to the total energy at order i, and the brackets ( . . . ) indicate the expectation value. In the right-hand side of Eqn. 1, expectation values are taken with respect to a zeroth-order state $|\psi^{(0)}\rangle$ that is a solution to the Schrodinger equation $\hat{H}^{(0)}|\psi^{(0)}\rangle = E_0|\psi^{(0)}\rangle$, where $E_0 = \langle\psi^{(0)}|\hat{H}^{(0)}|\psi^{(0)}\rangle$ is a zeroth-order energy that represents the non-relativistic energy of the state $|\psi\rangle$. The energy contribution $E_2 = \langle\psi^{(0)}|\hat{H}^{(2)}|\psi^{(0)}\rangle$ represents leading relativistic corrections and the energy contributions $E_3 = \langle\psi^{(0)}|\hat{H}^{(3)}|\psi^{(0)}\rangle$ and $E_4 = \langle\psi^{(0)}|\hat{H}^{(4)}|\psi^{(0)}\rangle$ represent higher-order relativistic and QED corrections. Note that there is no energy contribution that scales with the first order of the fine structure constant $\alpha$.

To further simplify the calculations in Eqn. 1, it is common to implement the infinite-nuclear-mass approximation in which the mass of the nucleus is assumed to be infinite and therefore the nucleus is spatially stationary. In molecular systems having more than one nucleus, the infinite-nuclear-mass approximation is equivalent to the Born-Oppenheimer approximation. To correct for the finite mass of the nucleus, the expansion of Eqn. 1 can be further expanded in powers of $\mu/M$, where $\mu$ is the reduced mass of the electron and M is the mass of the nucleus. This gives rise to a double expansion of the form:

$$E_{tot} = \left(\langle\hat{H}_{0,0}\rangle + \frac{\mu}{M}\langle\hat{H}_{0,1}\rangle + \left(\frac{\mu}{M}\right)^2\langle\hat{H}_{0,2}\rangle + \ldots\right) + \alpha^2\left(\langle\hat{H}_{2,0}\rangle + \frac{\mu}{M}\langle\hat{H}_{2,1}\rangle + \left(\frac{\mu}{M}\right)^2\langle\hat{H}_{2,2}\rangle + \ldots\right) + \alpha^3\left(\langle\hat{H}_{3,0}\rangle + \frac{\mu}{M}\langle\hat{H}_{3,2}\rangle + \left(\frac{\mu}{M}\right)^2\langle\hat{H}_{3,2}\rangle + \ldots\right) + \ldots \quad (2)$$

where $\langle\hat{H}_{i,j}\rangle$ represents all terms that contribute to both order $\alpha^i$ and $(\mu/M)^j$. All of the expectation values in Eqn. 2 are taken with respect to the zeroth-order state $|\psi^{(0)}\rangle$.

One aspect of the present embodiments is the realization that the infinite-nuclear-mass approximation is not necessary for perturbation calculations. Accordingly, the present embodiments implement a "finite-nuclear-mass" approach that solves for energies fully incorporating the effects of finite nuclear mass. By eliminating the infinite-nuclear-mass assumption, the present embodiments offer several advantages over prior-art perturbation and variational techniques. First, the double expansion of Eqn. 2 reduces back to the single expansion of Eqn. 1, which simplifies the complexity of the problem by reducing the number of contributions that need to be calculated (in order to reach a set accuracy of the total energy $E_{tot}$). Second, it is known in the prior art that there are many situations in which the Born-Oppenheimer approximation is not valid, and therefore gives erroneous answers. By eliminating the need to make the Born-Oppenheimer approximation, the present embodiments are valid for a wider range of atomic and molecular states and many-body systems, as compared to prior-art techniques that use the Born-Oppenheimer approximation. Thus, removing the Born-Oppenheimer approximation improves accuracy by vastly eliminating erroneous results. Accuracy is also improved by including the effects of finite nuclear mass exactly, rather than perturbatively.

The present embodiments will find application in testing quantum-mechanical calculations of many-body quantum systems. Such calculations are used to understand a variety of physical systems, such as atoms, molecules, positronium, nuclear systems, condensed matter systems, and ultracold systems (e.g., Efimov physics). The present embodiments also augment a variety of other computational techniques used to explore atomic and molecular structure, such as quantum Monte Carlo methods, configuration-interaction methods, and methods that use hyperspherical coordinate systems.

Another application area of the present embodiments is astrophysics. The interest in quantum-mechanical calculations of ground and excited states of molecules exposed to strong magnetic fields is related to the significant alteration of some of their chemical and physical properties in conditions where the magnetic interactions become comparable to the Coulombic interactions between electrons and nuclei forming the molecules (i.e., the strong-field regime). Such conditions exist, for example, in the atmospheres of rapidly rotating compact stellar objects, such as white dwarfs (up to 100 kT), neutron stars (up to 100 MT), and magnetars (up to 100 GT). The field strengths that exist on such stellar objects cannot be generated in laboratories on Earth, and therefore cannot be easily probed experimentally. As a result, quantum-mechanical modeling is the only way to elucidate this phenomenon. However, it is known that the Born-Oppenheimer approximation is invalid for molecules in the strong-field regime. Accordingly, there is a need for computational techniques that can simulate many-body phenomenon without the Born-Oppenheimer approximation.

The present embodiments may also help advance quantum computing and quantum information processing. For example, the present embodiments may be used to better understand the dynamics of neutral-atom states held in magnetic or optical traps, which may assist with the development of scalable quantum computing, quantum memory units, and quantum gates with improved fidelity.

Those skilled in the art will recognize that using the variational method of quantum mechanics to find energies of quantum many-body system can be an extremely intensive task in terms of the computational resources needed. This especially true when the energies need to be calculated to many digits of precision (e.g., tens or more) to be useful for the application at hand. For example, it is common for a variational solver to run for several days just to calculate a single energy. Due to this complexity, it is not feasible for a human to mentally perform such calculations, including those presented below. Accordingly, the present embodiments, when performed with a computer, vastly improve upon the accuracy and speed that a human could achieve.

DETAILED DESCRIPTION

Figure 1:
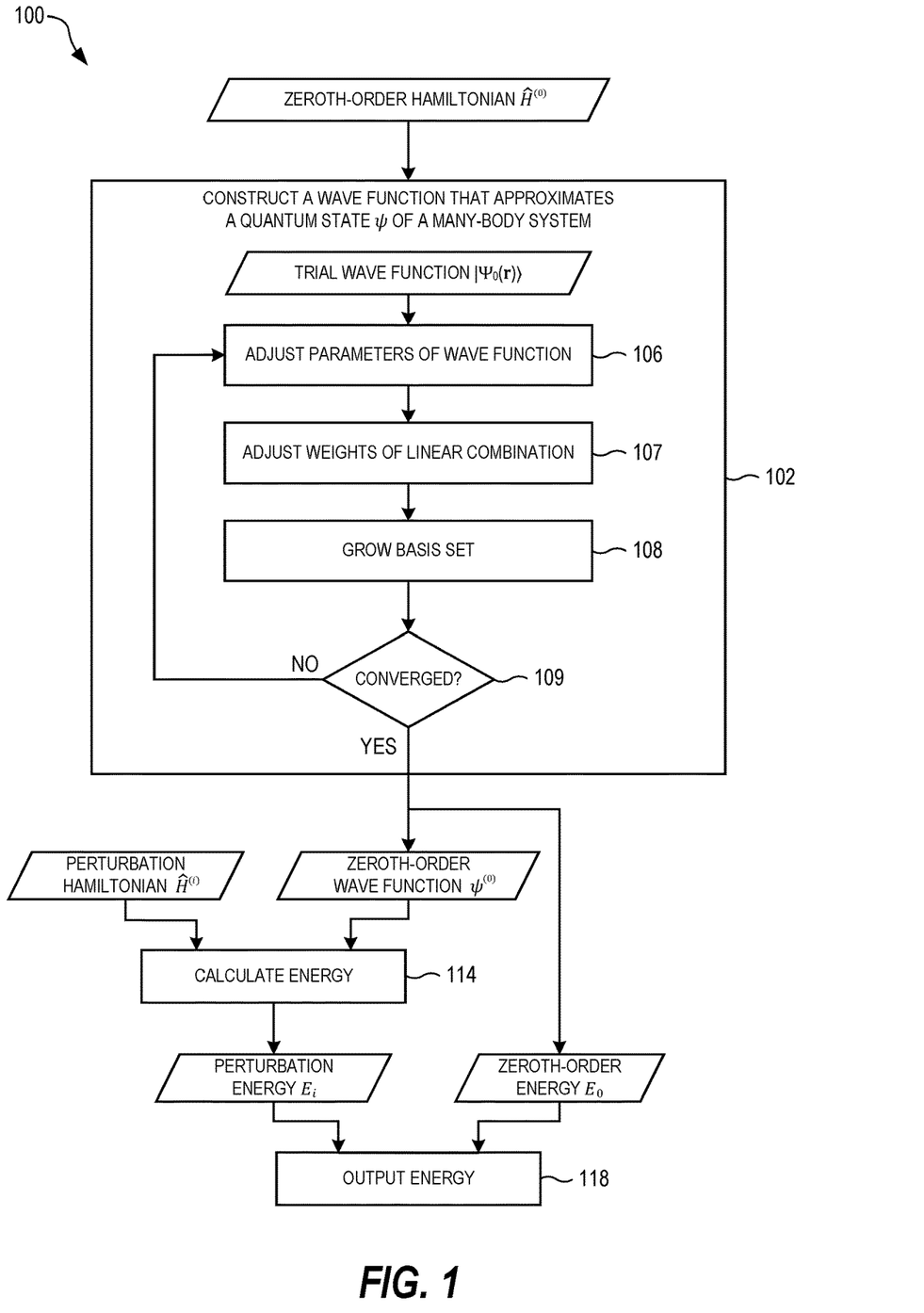
FIG. 1 is a flow chart of a method for determining a perturbation energy of a quantum state $\psi$ of a many-body system, in an embodiment.

FIG. 1 is a flow chart of a method 100 for determining a perturbation energy of a quantum state $\psi$ of a many-body system. In the block 102 of the method 100, a wave function is constructed that approximates the quantum state $\psi$. The block 102 implements the variational principle of quantum mechanics by constructing the wave function with parameters that are then adjusted to minimize the expectation value of a zeroth-order Hamiltonian $\hat{H}^{(0)}$. This expectation value is the zeroth-order energy $E_0$ of the quantum state $\psi$. When $E_0$ is minimized, the resulting wave function is outputted by the block 102 as a zeroth-order wave function $\psi^{(0)}$.

The zeroth-order Hamiltonian $\hat{H}^{(0)}$ models a many-body system formed from a plurality of interacting quantum particles. For example, the many-body system may be an atom, in which case one of the particles is a nucleus while all of the other particles are electrons. The atom may be a neutral atom or an atomic ion, and therefore may have any number of electrons. In another example, the many-body system is a molecule, in which case two or more of the particles are nuclei while all of the other particles are electrons. The molecule may be a neutral molecule or a molecular ion. The many-body system is not limited to atoms and molecules. For example, the many-body system may be a positronium complex, a Coulombic few-body system, a nuclear few-body system, or an excitonic complex. The many-body system may be another type of composite quantum system without departing from the scope hereof.

The zeroth-order Hamiltonian $\hat{H}^{(0)}$ differs from Hamiltonians used in prior-art perturbation methods in that it is constructed without the infinite-nuclear mass assumption. To implement this "finite-nuclear-mass" approach, the zeroth-other Hamiltonian $\hat{H}^{(0)}$ explicitly depends on a finite mass of each of the particles forming the many-body system. Therefore, none of the particles has a mass that is assumed to be infinite, and thus all of the particles are assumed to be moving in the internal reference frame of the many-body system. Since no assumptions are made about the particles' masses, the zeroth-order energy $E_0$ includes all effects due to finite nuclear mass; these effects are sometimes referred to in the prior art as "recoil effects".

As an example of a zeroth-order Hamiltonian constructed with the finite-nuclear-mass approach, consider an atom with N particles, of which one is a nucleus and n=N−1 are electrons. Starting with the nonrelativistic Hamiltonian in the laboratory frame, we separate out the center-of-mass motion by introducing an internal Cartesian coordinate system that is spatially centered at the nucleus. The positions of the electrons in this coordinate system are described by the vectors $r_i$ (i=1, ..., n). The separation of the center-of-mass motion is rigorous and results in the laboratory-frame Hamiltonian becoming a sum of the operator representing the kinetic energy of the center-of-mass motion and the following "internal" Hamiltonian:

$$\hat{H}_{int} = -\frac{1}{2}\left(\sum_{i=1}^{n}\frac{1}{\mu_i}\nabla_{r_i}^T\cdot\nabla_{r_i} + \frac{1}{m_0}\sum_{\substack{i,j=1\\i\neq j}}^{n}\nabla_{r_i}^T\cdot\nabla_{r_j}\right) + \sum_{i=1}^{n}\frac{q_0 q_i}{r_i} + \sum_{i>j=1}^{N}\frac{q_i q_j}{r_{ij}}, \quad (3)$$

where T denotes the matrix/vector transpose, $m_0$ is the nuclear mass, $q_0$ is the nuclear charge, $q_i$ are the electron charges, and $\mu_i = m_0 m_i/(m_0 + m_i)$ are electron reduced masses (where $m_i$, i=1, ..., n, are the electron masses). The internal Hamiltonian $\hat{H}_{int}$ of Eqn. 3 describes the motion of n (pseudo)electrons, whose masses have been changed to the reduced masses, in the central field of the nuclear charge. This motion is coupled through the Coulombic interactions $\Sigma_{i=1}^{n}(q_0 q_i/r_i) + \Sigma_{i>j=1}^{n}(q_i q_j/r_{ij})$, where $r_{ij} = |r_j - r_i|$, and the mass polarization term $$-\frac{1}{2}\sum_{\substack{i,j=1\\i\neq j}}^{n}(1/m_0)\nabla_{r_i}^T\cdot\nabla_{r_j}.$$

Under the infinite-nuclear-mass assumption, the mass polarization term is treated perturbatively and therefore excluded from the internal Hamiltonian $\hat{H}_{int}$.

As another example of a zeroth-order Hamiltonian constructed with the finite-nuclear-mass approach, consider an atom or molecule with N particles in a strong external magnetic field $B_z$ oriented along the z direction. In this case, the zeroth-order Hamiltonian $\hat{H}^{(0)}$ will include a field-free internal Hamiltonian similar to Eqn. 3, a Zeeman term $\hat{H}_{Zeeman}$, and a diamagnetic term $\hat{V}$. The Zeeman term $\hat{H}_{Zeeman}$ is $$\hat{H}_{Zeeman} = B_z \sum_{i=1}^{N} \frac{q_i}{2m_i} \hat{L}_{z_i} - B_z \sum_{i=1}^{N} g_i \mu_i \hat{S}_{z_i},$$

where $\hat{L}_{z_i}$ is the operator representing the z component of the orbital angular momentum of the $i^{th}$ particle, $\hat{S}_{z_i}$ is the operator representing the z component of the spin of the $i^{th}$ particle, $g_i$ is the g factor of the $i^{th}$ particle, and $\mu_i$ equals the negative of the Bohr magneton when the $i^{th}$ particle is an electron and the nuclear magneton when the $i^{th}$ particle is a nucleus. The diamagnetic term $\hat{V}$ is $$\hat{V} = \sum_{i=1}^{N} \frac{q_i^2}{8m_i} B_z^2 (\hat{X}_i^2 + \hat{Y}_i^2),$$

where $\hat{X}_i$ and $\hat{Y}_i$ are the x and y position operators, respectively, of the $i^{th}$ particle. As can be seen, the terms $\hat{H}_{Zeeman}$ and $\hat{V}$ both explicitly depend on the masses of all N particles.

To implement the variational method in the block 102, an initial trial wave function $|\Psi_0(r)\rangle$ is written as a linear combination of basis functions:

$$|\Psi_0(r)\rangle = \sum_{i=1}^{M} c_i |\phi_i(r, \{\beta\}_i)\rangle. \quad (4)$$

where r is a total position vector that combines the x, y, and z coordinates of each of the n electrons. The total position vector r has the form $$r = \begin{pmatrix} r_1 \\ r_2 \\ \vdots \\ r_n \end{pmatrix} = \begin{pmatrix} x_1 \\ y_1 \\ z_1 \\ \vdots \\ x_n \\ y_n \\ z_n \end{pmatrix}. \quad (5)$$

Each basis function $\phi_i(r, \{\beta\}_i)$ also depends on a set of parameters $\{\beta\}_i$. In the block 106 of the method 100, the parameters $\{\beta\}_i$ are adjusted to reduce the zeroth-order energy $E_0$. The analytic energy gradient determined with respect to these parameters may be used in the minimization. In the block 107 of the method 100, the weights $c_i$ of the linear combination of Eqn. 4 are adjusted to reduce the zeroth-order energy $E_0$ (e.g., by solving the secular equation). In the block 109, the zeroth-order energy $E_0$ is checked for convergence. If the zeroth-order energy $E_0$ has not converged, then the method 100 returns to the block 106. The block 102 continues to iteratively update the parameters $\{\beta\}_i$ and weights $c_i$ until the zeroth-order energy $E_0$ has converged.

In the present embodiments, each basis function $\phi_i$ is an explicitly correlated Gaussian (ECG) function of the form $$\phi_i(r) = \xi(r, \{j_i, k_i, \ldots\}) \exp[-r^T (A_i \otimes I_3) r], \quad (6)$$

where $\xi(r, \{j_i, k_i, \ldots\})$ is a preexponential angular factor that depends on position r and a set of electron labels $\{j_i, k_i, \ldots\}$ whose non-zero integer values can vary from 1 to n. These electron labels are used to select only some of the coordinates of the total position vector r, and belong to the set of variational parameters $\{\beta\}_i$. In Eqn. 6, $A_k$ is an n×n symmetric matrix of the exponential parameters of the Gaussian, $\otimes$ is the Kronecker product, and $I_3$ is a 3×3 identity matrix.

We denote $(A_k \otimes I_3)$ in Eqn. 6 as $\mathbb{A}_k$. Since the basis functions $\phi_i$ are used to expand wave functions of bound atomic states, they need to be square integrable. This only happens if the $\mathbb{A}_k$ is positive definite. To make it positive definite, we represent it in the Cholesky-factored form as $\mathbb{A}_k = (L_k L_k^T) \otimes I_3$, where $L_k$ is a n×n lower triangular matrix. With the $L_k$ matrix elements being any real numbers, $\mathbb{A}_k$ is positive definite. This is an important feature because it allows us to use the $L_k$ matrix elements as the variational optimization parameters which can be varied without any restrictions in the range form $-\infty$ to $+\infty$. Thus, the $L_k$ matrix elements also belong to the set of variational parameters $\{\beta\}_i$.

As an example of Eqn. 6, consider atomic D states (i.e., L=2 states) having electronic configurations where one or two of the n electrons occupy a non-s state. Examples of such states include the $1s^2 2p^2$ and $1s^2 2s^1 nd^1$ $^1D$ states of beryllium. To construct the spatial part of the wave function of an atomic D (with $M_L=0$) state with a single d electron or two p electrons using ECGs, one may use the following functions, which are products of Gaussian exponentials and Cartesian angular harmonics:

$$\phi_k^{(L=2)} = (x_{i_k} x_{j_k} + y_{i_k} y_{j_k} - 2 z_{i_k} z_{j_k}) \exp[-r^T (A_k \otimes I_3) r], \quad (7)$$

where the electron labels $i_k$ and $j_k$, whose value can vary from 1 to n, are either equal or not equal to each other. In another example of Eqn. 6, consider atomic P states (i.e., L=1 states). In this case, the ECG functions may have the form:

$$\phi_k^{(L=1)} = z_{i_k} \exp[-r^T (A_k \otimes I_3) r], \quad (8)$$

where the electron label $i_k$ varies from 1 to n.

More generally, the preexponential angular factor $\xi$ may have the form of a generalized spherical harmonic $\Theta_{LM}$, which can be formed by successively coupling spherical harmonics. In this way, Eqn. 6 can be extended to generate basis states for values of angular momentum L>2. In the present embodiments, it is assumed that total angular momentum J is non-zero, and therefore the atomic state does not have spherical symmetry. Accordingly, the preexponential angular factor $\xi$ cannot solely be $Y_{0,0}$.

In some embodiments, the ECG functions have shifted centers:

$$\phi_i(r) = \xi(r, \{j_i, k_i, \ldots\}) \exp[-(r-s_k)^T (A_i \otimes I_3)(r-s_k)], \quad (9)$$

where the 3n-component vectors $s_k$ are variational parameters that belong to the set $\{\beta\}_i$. In other embodiments, the ECG functions have complex coefficients:

$$\phi_i(r) = \xi(r, \{j_i, k_i, \ldots\}) \exp[-r^T ((A_i + iB_i) \otimes I_3) r], \quad (10)$$

where $A_i$ and $B_i$ are matrices of real variational parameters.

In other embodiments, the ECG functions are multiplied by even powers of internuclear distances. For example, the basis functions for a diatomic molecule may be of the form:

$$\phi_i(r) = r_{nn}^{2p} \xi(r, \{j_i, k_i, \ldots\}) \exp[-r^T((A_i + iB_i) \otimes I_3)r], \quad (11)$$

where p is a non-zero positive integer and $r_{nn}$ is the scalar distance between the two nuclei.

The proper permutational symmetry of the wave function may be implemented with the spin-free formalism, as known in the art. In this formalism, an appropriate symmetry projector is constructed and applied to the spatial parts of the wave function to impose the desired symmetry properties. The projector, which introduces the desired symmetry properties, is constructed using Young operators, as known in the art.

In some embodiments, the method 100 includes a block 102 in which the set of M basis functions in the trial wave function, also referred to herein as the basis set, is grown. Specifically, the number M of basis functions in the linear combination of Eqn. 4 is increased. While the initial trail wave function may include only a few basis functions, the basis set may be periodically increased, eventually containing thousands of basis functions, or more. Growing the basis set typically helps reduce the zeroth-order energy $E_0$, thereby producing in a zeroth-order wave function $\psi^{(0)}$ that is a better approximation to the quantum state $\psi$. Note that the block 108 need not be executed with every iteration.

Growing the basis set is a multistep process. For example, it may involves choosing a small starting set of ECGs (for the lowest state this set is generated using an orbital guess obtained using a standard atomic orbital basis set; for a higher state a basis set generated for the next lower state is used as the initial guess; usually a rather small basis set is used as an initial guess). After the initial basis set is optimized, small groups of basis functions may be added to the basis set. These added basis functions may then be optimized, after which the entire basis set may then be reoptimized. These steps may be performing using the one-function-at-the time approach. The initial guess for an added basis function may be generated by selecting a set of most contributing functions already included in the basis set, randomly perturbing their non-linear exponential parameters, and choosing the function which lowers the energy the most. The chosen function is added to the basis set and its parameters (i.e., the $L_k$ matrix elements) are optimized using the analytic energy gradient. Also, at this stage, the $i_k$ and $j_k$ indices involved in the pre-exponential angular factor may be optimized. This may the only time the optimization of these indices is performed. After a certain number of functions (e.g., 100) is added to the basis set, the entire basis set may be reoptimized. This reoptimization involves cycling over all functions, one by one, several times, and reoptimizing their parameters.

In the calculations performed previously for other many-body systems, it was determined that the above strategy for growing a basis set is efficient and numerically stable. The stability of the calculations is also enhanced by checking for any linear dependencies between the basis functions that may appear during the optimization. Such dependencies may lead to numerical inaccuracies and destabilization of the optimization process. If during the optimization of a basis function it becomes linearly dependent with any other function already included in the basis set, the function is reset to what it was before the optimization. The use of the analytic gradient is crucial in making the optimization efficient and in generating very well converged results, i.e. the non-relativistic energy and the corresponding wave function.

The block 102 ends when the zeroth-order energy $E_0$ has converged, and when attempts to grow the basis set have not succeeded in further reducing the zeroth-order energy $E_0$. The method 100 then continues to the block 114, where a perturbation energy $E_i$ is calculated from the zeroth-order wave function $\psi^{(0)}$ and a perturbation Hamiltonian $\hat{H}^{(i)}$. Like the zeroth-order Hamiltonian $\hat{H}^{(0)}$, the perturbation Hamiltonian $\hat{H}^{(i)}$ should be constructed with the finite-nuclear-mass approach described above to ensure that the perturbation energy $E_i$ incorporates all effects due to finite nuclear mass.

As an example of the perturbation Hamiltonian $\hat{H}^{(i)}$, consider relativistic corrections of order $\alpha^2$ to the internal Hamiltonian $\hat{H}_{int}$ of Eqn. 3. The operators representing these corrections include a mass-velocity term, a Darwin term, an orbit-orbit coupling term, a spin-spin coupling term. When expressed in the internal coordinate system of the atom using the finite-nuclear-mass approach, the mass-velocity term is $$\hat{H}_{MV} = -\frac{1}{8}\left[\frac{1}{m_0^3}\left(\sum_{i=1}^{n}\nabla_{r_i}\right)^4 + \sum_{i=1}^{n}\frac{1}{m_i^3}\nabla_{r_i}^4\right], \quad (12)$$

the Darwin term is $$\hat{H}_D = \frac{\pi}{2}\sum_{i=1}^{n}\left(\frac{4}{3}\frac{1}{m_0^2} + \frac{1}{m_i^2}\right)q_0 q_i \delta^3(r_i) + \frac{\pi}{2}\sum_{i=1}^{n}\sum_{j\neq i}^{n}\frac{1}{m_i^n}q_i q_j \delta^3(r_{ij}), \quad (13)$$

the orbit-orbit coupling term is $$\hat{H}_{OO} = -\frac{1}{2}\sum_{i=1}^{n}\sum_{j=1}^{n}\frac{q_0 q_j}{m_0 m_j}\left[\frac{1}{r_j}\nabla_{r_i}^T \cdot \nabla_{r_j} + \frac{1}{r_j^3}r_j^T \cdot (r_j^T \cdot \nabla_{r_i})\nabla_{r_j}\right] + \quad (14)$$

$$\frac{1}{2}\sum_{i=1}^{n}\sum_{j>i}^{n}\frac{q_i q_j}{m_i m_j}\left[\frac{1}{r_{ij}}\nabla_{r_i}^T \cdot \nabla_{r_j} + \frac{1}{r_{ij}^3}r_{ij}^T \cdot (r_{ij}^T \cdot \nabla_{r_i})\nabla_{r_j}\right],$$

and the spin-spin coupling term is $$\hat{H}_{SS} = -\frac{8\pi}{3}\sum_{\substack{i,j=1\\j>i}}^{4}\frac{q_i q_j}{m_i m_j}(s_i \cdot s_j)\delta(r_{ij}), \quad (15)$$

where $\delta(r)$ is the Dirac delta function and $s_i$ are spin operators for individual electrons. Note that $\hat{H}_{MV}$, $\hat{H}_D$, $\hat{H}_{oo}$ each depend explicitly on all of the particle masses, including the nuclear mass $m_0$. While the spin-spin term $\hat{H}_{ss}$ does not explicitly depend on all of the particle masses, the perturbation energy $\langle \psi^{(0)}|\hat{H}_{SS}|\psi^{(0)}\rangle$ correctly accounts for finite nuclear mass because the zeroth-order wave function used to calculate this expectation value is fully dependent on the finite nuclear masses. When the quantum state $\psi$ has non-zero total spin, the relativistic corrections will also include a spin-orbit coupling term, which will also depend explicitly on all of the particle masses when constructed in the finite-nuclear-mass approach.

The method 100 also includes a block 118 in which the perturbation energy is outputted. In some embodiments, only the perturbation energy $E_i$ is outputted. In other embodiments, the zeroth-order energy $E_0$ is also outputted. In yet other embodiments, the sum of the perturbation energy $E_i$ and zeroth-order energy $E_0$ is outputted as a total energy.

Figure 2:
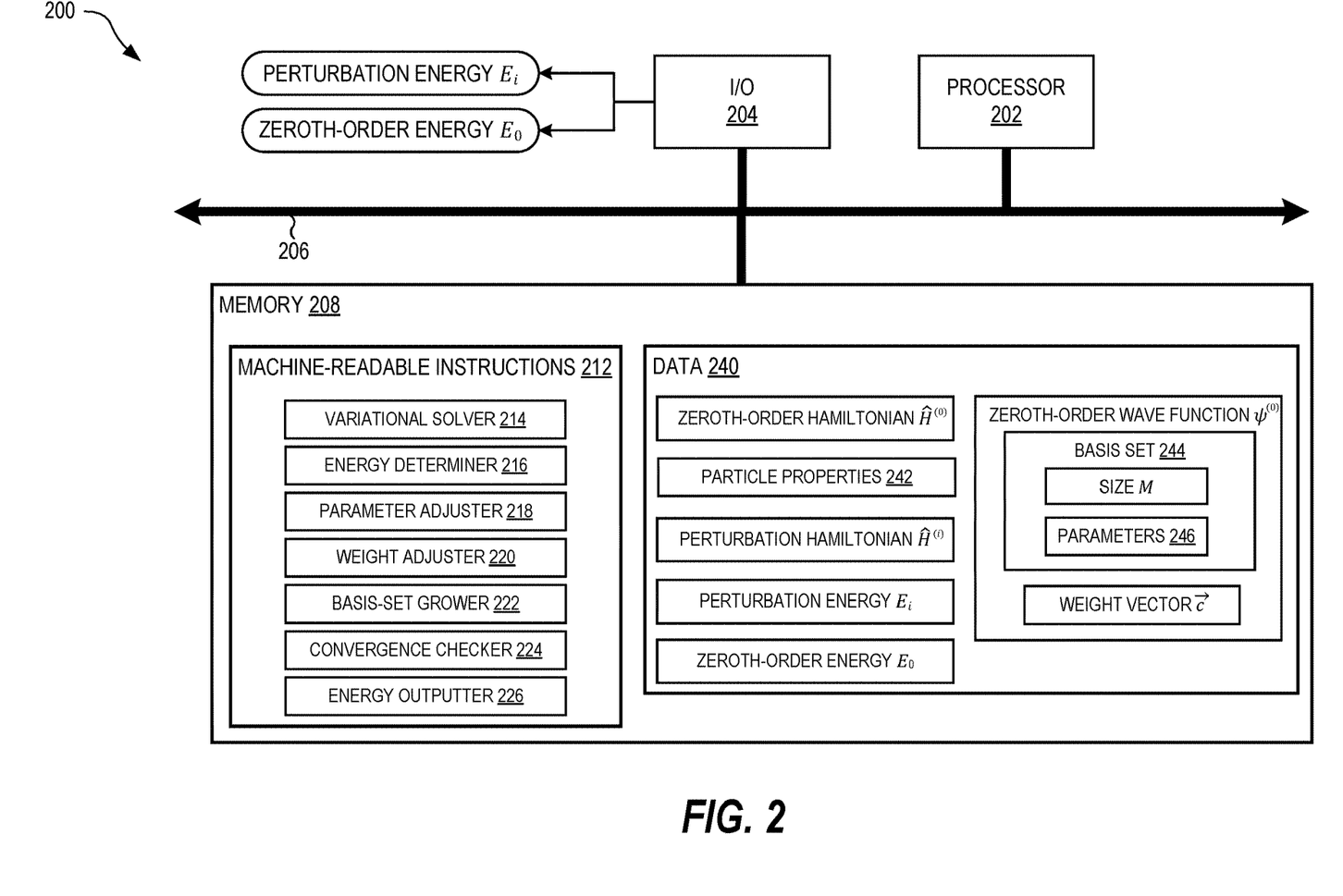
FIG. 2 is a diagram of a system for determining a perturbation energy of a quantum state $\psi$ of a many-body system, in an embodiment.

FIG. 2 is a diagram of a system 200 for determining a perturbation energy of a quantum state ψ of a many-body system. The system 200 is a computing device that implements the present method embodiments. The system 200 includes a processor 202 and a memory 208 that communicate with each other over a system bus 206. The processor 202 may be any type of circuit or chip capable of performing logic, control, and input/output operations. For example, the processor 202 may include one or more of a microprocessor with one or more central processing unit (CPU) cores, a graphics processing unit (GPU), a digital signal processor (DSP), a field-programmable gate array (FPGA), a system-on-chip (SoC), and a microcontroller unit (MCU). The processor 202 may also include a memory controller, bus controller, and other components that manage data flow between the processor 202, memory 208, and other devices connected to the bus 206. Although not shown in FIG. 2, the system 200 may also have a secondary storage device, such as a hard disk drive, solid-state drive, or optical storage device.

The system 200 may also include at least one I/O block 204 that outputs one or both of the perturbation energy $E_i$ and the zeroth-order energy $E_0$ to a peripheral device (not shown). The I/O block 204 is connected to the system bus 206 and therefore can communicate with the processor 202 and memory 208. In some embodiments, the peripheral device is a monitor or screen that displays one or both of the perturbation energy $E_i$ and the zeroth-order energy $E_0$. Alternatively, the I/O block 304 may implement a wired network interface (e.g., Ethernet, Infiniband, Fibre Channel, etc.), wireless network interface (e.g., WiFi, Bluetooth, BLE, etc.), cellular network interface (e.g., 4G, 5G, LTE), optical network interface (e.g., SONET, SDH, IrDA, etc.), multimedia card interface (e.g., SD card, Compact Flash, etc.), or another type of communication port through which the system 200 can communicate with another device.

The memory 208 stores machine-readable instructions 212 that, when executed by the processor 202 control the system 200 to implement the functionality and methods described above. The memory 208 also stores data 240 used by the processor 202 when executing the machine-readable instructions 212. In the example of FIG. 2, the data 240 includes the zeroth-order Hamiltonian $\hat{H}^{(o)}$, the perturbation Hamiltonian $\hat{H}^{(i)}$, the perturbation energy $E_i$, and the zeroth-order energy $E_0$. The data 240 also includes particle properties 242, which includes the finite mass and charge of each of the particles represented in the zeroth-order Hamiltonian $\hat{H}^{(o)}$. The data 242 also includes the zeroth-order wave function $\psi^{(o)}$ as a basis set 244 of ECGs with parameters 246 and a size M. The data 240 also stores the weights of Eqn. 4 as a weight vector $\vec{c}$. The memory 208 may store additional data 240 than shown. In addition, some or all of the data 240 may be stored in a secondary storage device and fetched therefrom when needed.

In the example of FIG. 2, the machine-readable instructions 212 include a variational solver 214, an energy determiner 216, a parameter adjuster 218, a weight adjuster 220, a basis-set grower 222, a convergence checker 224, and an energy outputter 226. The variational solver 214 implements the block 102 of the method 100 by constructing the wave function $\psi_0$. The variational solver 214 call the parameter adjuster 218, which implements the block 106 of the method 100 by adjusting the parameters 246 of the wave function $\psi^{(o)}$ to minimize the zeroth-order energy $E_0$. The variational solver 214 may also call the weight adjuster 220, which implements the block 107 of the method 100 by adjusting the weight vector $\vec{c}$. The variational solver 214 may also call the convergence checker 224, which implements the block 109 of the method 100 by determining if the zeroth-order energy $E_0$ has converged. In some embodiments, the variational solver 214 calls the basis-set grower 222, which implements the block 108 of the method 100 by growing the basis set 244. The energy determiner 216 implements the block 114 of the method 100 by calculating the zeroth-order energy $E_0$ from the perturbation Hamiltonian $\hat{H}^{(i)}$ and the zeroth-order wave function $\psi^0$). The energy outputter 226 implements the block 118 of the method 100 by outputting the perturbation energy $E_i$. The energy outputter 226 may also output the zeroth-order energy $E_0$ or the sum $E_0+E_i$ of the perturbation and zeroth-order energies as a total energy. The memory 208 may store additional machine-readable instructions 212 than shown in FIG. 2 without departing from the scope hereof.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for determining a perturbation energy of a quantum state of a many-body system, comprising:
   constructing a wave function that approximates the quantum state by adjusting parameters of the wave function to minimize an expectation value of a zeroth-order Hamiltonian, wherein:
   the zeroth-order Hamiltonian explicitly depends on a finite mass of each of a plurality of interacting quantum particles that form the many-body system;
   the quantum state has a non-zero total angular momentum;
   the wave function is expressed as a linear combination of explicitly correlated Gaussian basis functions; and
   each of the explicitly correlated Gaussian basis functions includes a preexponential angular factor;
   calculating a theoretical estimate of the perturbation energy based on the wave function and a perturbation Hamiltonian that explicitly depends on the finite mass of each of the plurality of interacting quantum particles; and
   outputting the theoretical estimate of the perturbation energy for use in configuring an apparatus such that the apparatus is capable of performing a measurement of a transition energy of the many-body system, the transition energy being based on the perturbation energy, the measurement of the transition energy having an experimental uncertainty that is equal to or less than the theoretical estimate of the perturbation energy.

2. The method of claim 1, wherein said adjusting the parameters includes iteratively adjusting (i) one or more variational parameters of the explicitly correlated Gaussian basis functions and (ii) one or more weights of the linear combination.

3. The method of claim 2, wherein said adjusting the one or more variational parameters includes adjusting one or more integer parameters of the preexponential angular factor of each of the explicitly correlated Gaussian basis functions.

4. The method of claim 2, wherein said adjusting the one or more variational parameters includes adjusting one or more complex variational parameters of each of the explicitly correlated Gaussian basis functions.

5. The method of claim 1, wherein:
the zeroth-order Hamiltonian represents a non-relativistic energy of the many-body system; and
the perturbation Hamiltonian represents one or more relativistic corrections to the non-relativistic energy.

6. The method of claim 5, the perturbation Hamiltonian including one or more of:
a mass-velocity term;
a Darwin term;
an orbit-orbit interaction term;
a spin-orbit interaction term; and
a spin-spin interaction term.

7. The method of claim 1, wherein:
only one of the plurality of interacting quantum particles represents an atomic nucleus; and
each of a remaining plurality of the interacting quantum particles represents an electron.

8. The method of claim 1, wherein:
each of a first plurality of the interacting quantum particles represents an atomic nucleus; and
each of a remaining second plurality of the interacting quantum particles represents an electron.

9. The method of claim 1, the zeroth-order Hamiltonian including an external-field term that represents an interaction of the many-body system with an external field.

10. The method of claim 1,
further comprising adding the theoretical estimate of the perturbation energy to the expectation value of the zeroth-order Hamiltonian to obtain a total energy of the quantum state;
wherein said outputting the theoretical estimate of the perturbation energy includes outputting the total energy of the quantum state.

11. A system for determining a perturbation energy of a quantum state of a many-body system, comprising:
a processor;
a memory in communication with the processor, the memory storing machine-readable instructions that, when executed by the processor, control the system to:
construct a wave function that approximates the quantum state by adjusting parameters of the wave function to minimize an expectation value of a zeroth-order Hamiltonian that explicitly depends on a finite mass of each of a plurality of interacting quantum particles that form the many-body system, the quantum state having a non-zero total angular momentum, the wave function being expressed as a linear combination of explicitly correlated Gaussian basis functions, each of the explicitly correlated Gaussian basis functions including a preexponential angular factor,
calculate a theoretical estimate of the perturbation energy based on the wave function and a perturbation Hamiltonian that explicitly depends on the finite mass of each of the plurality of interacting quantum particles, and
output the theoretical estimate of the perturbation energy for use in configuring an apparatus such that the apparatus is capable of performing a measurement of a transition energy of the many-body system, the transition energy being based on the perturbation energy, the measurement of the transition energy having an experimental uncertainty that is equal to or less than the theoretical estimate of the perturbation energy.

12. The system of claim 11, wherein the machine-readable instructions that, when executed by the processor, control the system to adjust the parameters of the wave function include machine-readable instructions that, when executed by the processor, control the system to iteratively adjust (i) one or more variational parameters of the explicitly correlated Gaussian basis functions and (ii) one or more weights of the linear combination.

13. The system of claim 12, wherein the machine-readable instructions that, when executed by the processor, control the system to adjust the one or more variational parameters include machine-readable instructions that, when executed by the processor, control the system to adjust one or more integer parameters of the preexponential angular factor of each of the explicitly correlated Gaussian basis functions.

14. The system of claim 12, wherein the machine-readable instructions that, when executed by the processor, control the system to adjust the one or more variational parameters include machine-readable instructions that, when executed by the processor, control the system to adjust one or more complex variational parameters of each of the explicitly correlated Gaussian basis functions.

15. The system of claim 12, wherein:
the zeroth-order Hamiltonian represents a non-relativistic energy of the many-body system; and
the perturbation Hamiltonian represents one or more relativistic corrections to the non-relativistic energy.

16. The system of claim 15, the perturbation Hamiltonian including one or more of:
a mass-velocity term;
a Darwin term;
an orbit-orbit interaction term;
a spin-orbit interaction term; and
a spin-spin interaction term.

17. The system of claim 11, wherein:
only one of the plurality of interacting quantum particles represents an atomic nucleus; and
each of a remaining plurality of the interacting quantum particles represents an electron.

18. The system of claim 11, wherein:
each of a first plurality of the interacting quantum particles represents an atomic nucleus; and
each of a remaining second plurality of the interacting quantum particles as an electron.

19. The system of claim 11, the zeroth-order Hamiltonian including an external-field term that represents an interaction of the many-body system with an external field.

20. The system of claim 11, wherein:
the memory stores additional machine-readable instructions that, when executed by the processor, control the system to add the theoretical estimate of the perturbation energy to the expectation value of the zeroth-order Hamiltonian to obtain a total energy of the quantum state; and
the machine-readable instructions that, when executed by the processor, control the system to output the theoretical estimate of the perturbation energy include machine-readable instructions that, when executed by the processor, control the system to output the total energy of the quantum state.

* * * * *